United States Patent [19]

Barr

[11] Patent Number: 5,051,740

[45] Date of Patent: Sep. 24, 1991

[54] PAGING TERMINAL

[75] Inventor: William M. Barr, Lake Worth, Fla.

[73] Assignee: Motorola, Inc., Schaumburg, Ill.

[21] Appl. No.: 395,685

[22] Filed: Aug. 18, 1989

[51] Int. Cl.$^5$ .............................................. H04B 7/00
[52] U.S. Cl. .................................. 340/825.44; 379/67; 379/88
[58] Field of Search ........... 340/825.44, 311.1, 825.47, 340/825.48; 455/31, 32, 33, 38, 8, 9, 67, 115; 379/56, 57, 58, 67, 88, 89, 4, 133; 370/85.1, 94.1, 100.1, 13.1, 61

[56] References Cited

U.S. PATENT DOCUMENTS

| | | | |
|---|---|---|---|
| 4,415,770 | 11/1983 | Kai et al. | 455/67 |
| 4,443,661 | 4/1984 | Kubo | 455/67 |
| 4,577,060 | 3/1986 | Webb et al. | 379/57 |
| 4,713,808 | 12/1987 | Gaskill et al. | 370/94.1 |
| 4,713,810 | 12/1987 | Chum | 379/4 |
| 4,882,729 | 11/1989 | Lobel et al. | 370/100.1 |
| 4,903,321 | 2/1990 | Hall et al. | 455/8 |
| 4,926,460 | 5/1990 | Gutman et al. | 379/57 |
| 4,942,598 | 7/1990 | Davis | 379/57 |

FOREIGN PATENT DOCUMENTS

| | | | |
|---|---|---|---|
| 0228760 | 10/1986 | Japan | 379/57 |
| 0089724 | 4/1989 | Japan | 455/54 |

OTHER PUBLICATIONS

"The Thames Valley Radiopaging Trial"; N. W. Brown, D. Willetts; *Post Office Electrical Engineers' Journal;* Jul. 1976.

Motorola, "MVME147BUG 147Bug Debugging Package User's Manual", @1988, pp. 3-1 to 3-2, 6-3 to 6-13, 6-24, and an unnumbered page.

Motorola, "PageBridge Paging Control Center User's Guide 68P81001B20-0", Mar. 1989, pp. 5-43 to 5-44, 6-1 to 6-2, and 10-1 to 10-9.

Motorola, "MODAX 500A Radio Paging Terminal Instruction Manual E09DAA1000", @1986, in installation section pp. 1-1 to 1-2, pp. 3-3 to 3-4 (Table 3-1), pp. 4-11 to 4-12 (Table 4-1), in schematics section pp. 1-1 to 1-10 (FIG. 1-1), p. 2-2 (FIG. 2-1), and in the transmitter control units section pp. 1 to 2 (Table 1), p. 10, p. 16, and p. 31 (Table 3).

*Primary Examiner*—Donald J. Yusko
*Assistant Examiner*—Dervis Magistre
*Attorney, Agent, or Firm*—William E. Koch; Vincent B. Ingrassia

[57] ABSTRACT

A paging terminal is provided for storing incoming pages during terminal downtime and subsequent transmission thereof.

11 Claims, 3 Drawing Sheets

— PRIOR ART —

PAGING TERMINAL

FIELD OF THE INVENTION

This invention relates in general to communications systems such as selective call receiver systems and, more specifically, to a paging terminal that stores received messages during terminal downtime.

BACKGROUND OF THE INVENTION

Paging systems typically comprise a paging terminal and a radio frequency transmitter interfaced with a public switched telephone network (PSTN) to allow system user to send a page via telephone to any of a plurality of pagers. Two popular methods currently exist for entering pages into the terminal through the telephone. In the first method, each pager in the system has, associated with it, at least one telephone number that is recognized by the system and corresponds to a code that resides in the pager's memory. By entering a particular number into the telephone, the system user indicates which page in the system he wishes to alert and causes the paging system to generate and transmit that pager's code. In the case where the pager being paged is an information type such as voice, numeric, or alphanumeric, the terminal follows the initial telephone connection by prompting the user to enter any information he wishes to send to the pager (for example: voice, numeric, or alphanumeric message).

In the second page entry method, the paging terminal is accessed by calling a predetermined terminal access telephone number that is independent of particular system user or pager. After connection to the terminal in this manner, the system user is prompted by the system to enter a plurality of digits (typically four) that are recognized by the system and corresponds to a code stored in the memory of the pager he wishes to alert. Then, as in the first method, the terminal prompts the system user to enter an appropriate information message for an information-type pager.

It should be noted that for applications such as alpha paging and on-site paging, the telephone and PSTN or portion thereof can be replaced by various other appropriate data entry devices.

Since the paging terminal must perpetually manage the receipt, processing, and retransmission of a plurality of messages, the terminal typically comprises a memory for queueing received pages. Normally, the terminal memory is managed on a first in, first out basis. When stored pages reach the "top" of the queue, they are sent to the radio frequency transmitter where they are applied as modulation to the radio frequency and sent over-the-air to the user of the paging receiver.

An important shortcoming of today's art int he area of paging systems is the handling of pages entered into the terminal during system downtime. Typically, when paging systems are down from malfunction or during maintenance, they do not accept new incoming pages. If a system user attempts to enter a page into a system that is down, he will normally receive some type of notification that the paging system is down and that he should try to enter his page at a later time. The characteristics of today's systems can be inefficient and frustrating. When a system user has an important page to send during system downtime, he must continue to retry sending until the system is again running, which can be very time-consuming and aggravating since the user must remember to repeatedly attempt to send the page until the system is again running and accepts it.

Thus, what is needed is an improved paging system for handling incoming pages during system downtime.

SUMMARY OF THE INVENTION

Accordingly, it is an object of the present invention to provide an improved paging system.

In carrying out the above and other objects of the invention in one form, there is provided an apparatus comprising a first element for relaying messages and a second element for detecting a malfunction within the first element and storing the messages.

DETAILED DESCRIPTION OF THE INVENTION

Figure 1:
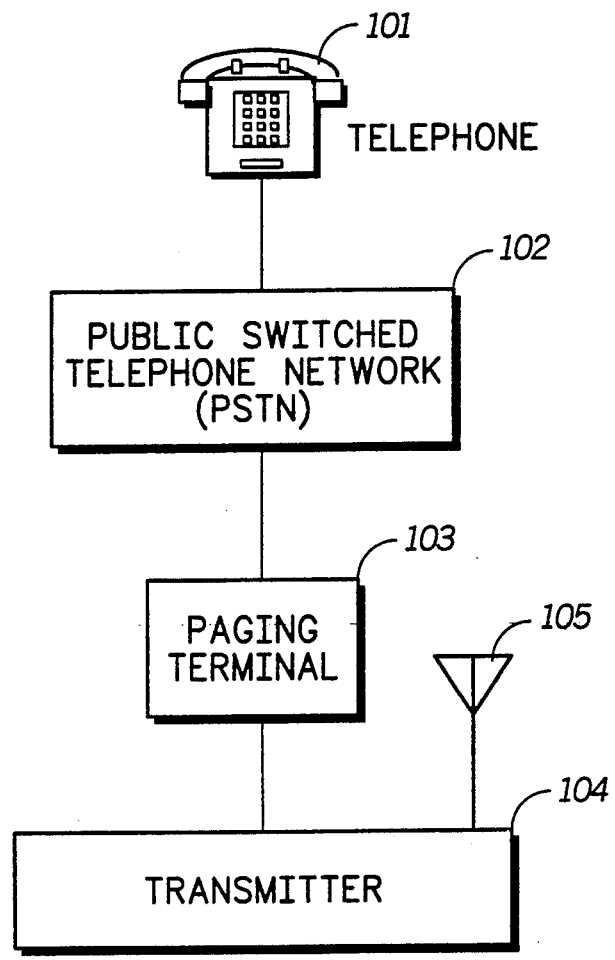
FIG. 1 is a block diagram of a prior art paging system.

Referring to FIG. 1, a typical paging system comprises a telephone 101 through which paging calls are initiated and entered into the system by system users. A system user who wishes to alert a particular pager simply calls, using the telephone 101, the predetermined telephone number that is allocated to that particular pager. The incoming page is routed from the telephone 101 through the public switched telephone network (PSTN) 102 to the paging terminal 103. Once contact is established with the paging terminal 103, the system user is prompted to enter additional page information through the telephone 101, if appropriate. The precise nature of the particular additional information depends on the type of pager the system user is paging and, in the case of a voice pager, would comprise the system user's voice message and n the case of a numeric display pager, would comprise numeric data entered by the system user through the keypad on the telephone 101. It is noted here that, alternatively, the telephone 101 and PSTN 102 or a portion thereof can be replaced by a different type of data entry device such as an alphanumeric keyboard, which could be used to enter paging messages int he case where the pager being paged is an alphanumeric model. Also, in some applications, the PSTN 102 can be replaced by a private automatic branch exchange (PABX).

After completion of message entry, the entered page is processed and stored in queue within the paging terminal 103 and, upon reaching the "top" of the queue, it is sent to the transmitter 104 where it is applied as modulation to a radio frequency carrier signal and sent to the pager(s) over the air through antenna 105.

Figure 2:
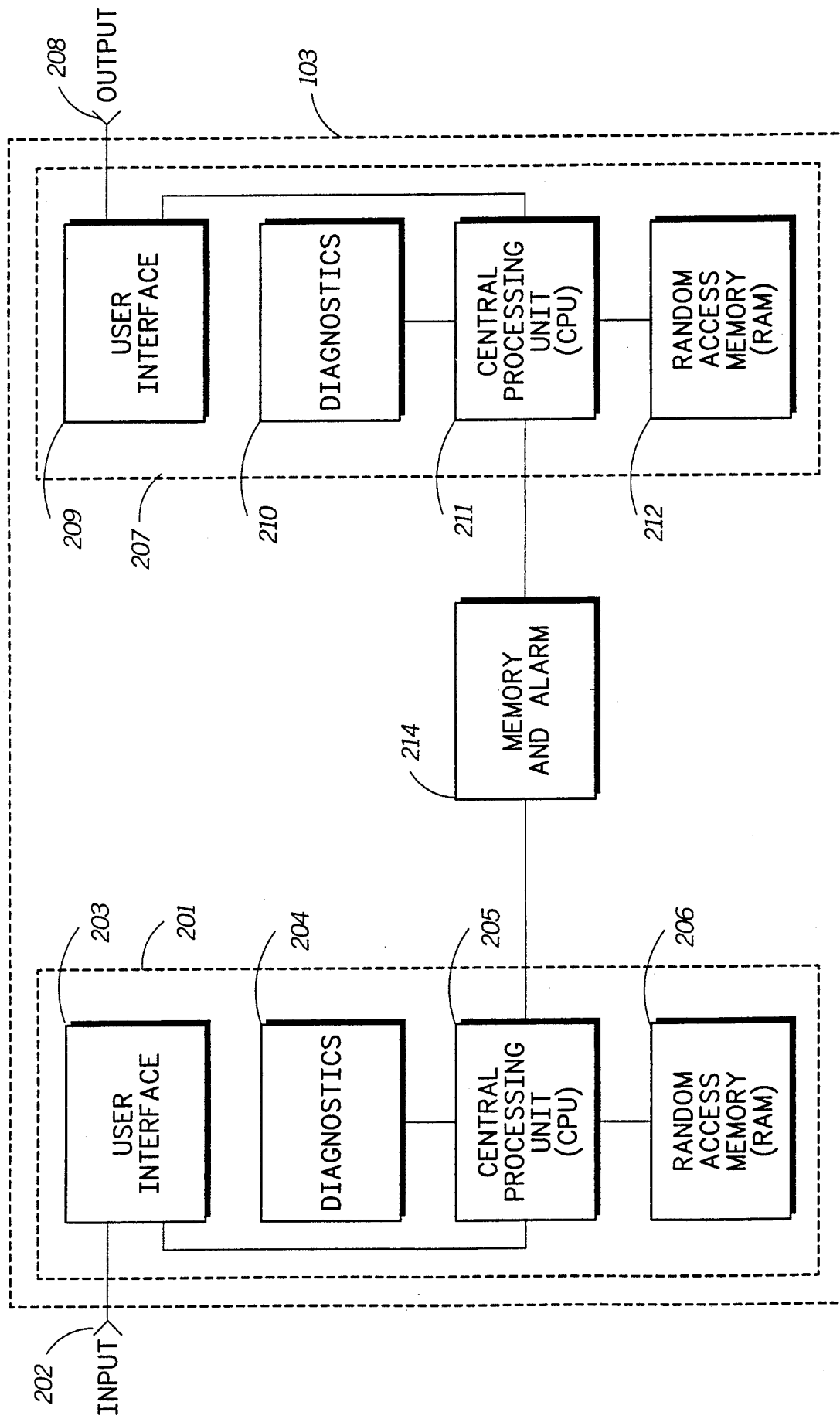
FIG. 2 is a block diagram of a paging terminal in accordance with the preferred embodiment of the invention.

Referring to FIG. 2, the paging terminal 103 comprises an input board 201 and an output board 207. A page incoming from the PSTN 102 enters the input board 201 of the paging terminal 103 through the input 202 and the user interface 203. The user interface 203 comprises the circuitry necessary to "talk" to the PSTN 102. After processing by the user interface 203, the page is input to the central processing unit (CPU) 205 where it is processed and formatted. Next, the processed, formatted page is output from the CPU 205 and the input board 201 of the memory and alarm 214. In the memory and alarm 214, pages are queued for subsequent transmission to the output board 207, usually on a first in, first out (FIFO) basis. When a page progresses to the "top" of the queue, it is output from the memory and alarm 214 to the CPU 211 of the output board 207. The page is then processed and formatted by the CPU 211, then output to the user interface 209. The user interface 209 converts the page to be sent into a form that can be applied to the radio frequency carrier as modulation, and the result is output to the transmitter 104 from the user interface 209 and the output board 207 at the output 208.

The diagnostics 204 and 210 of the input board 201 and the output board 207, respectively, comprise circuitry and software and monitor the functions of all pertinent circuits within the boards and provided control signals that are output from the CPU 205 and the CPU 211 to the memory and alarm 214 to generate an alarm in the event of a circuit malfunction, using known techniques. In the preferred embodiment of the invention, the occurrence of an alarm is used as a trigger signal to tell the system software to send the system into a mode in which system users that attempt to enter pages are informed that their pages will be delayed for an indefinite period of time and are asked if they want to store their pages within the terminal for later processing and transmission.

An additional feature available within the diagnostics 204 and 210 comprises a maintenance mode. In the maintenance mode, a person that wishes to service the terminal for a period of time can program the estimated repair time into the terminal. Then, during repair, the alarm is active, and users attempting to enter pages into the system will be appraised of a specific time delay (the repair time remaining plus the time required to send previously stored pages), and the user will be asked if he wants to store the page. Upon the termination of repair time, page delay information is added by the terminal to all stored pages as they are sent, usually on a first in, first out basis, to the transmitter.

Figure 3:
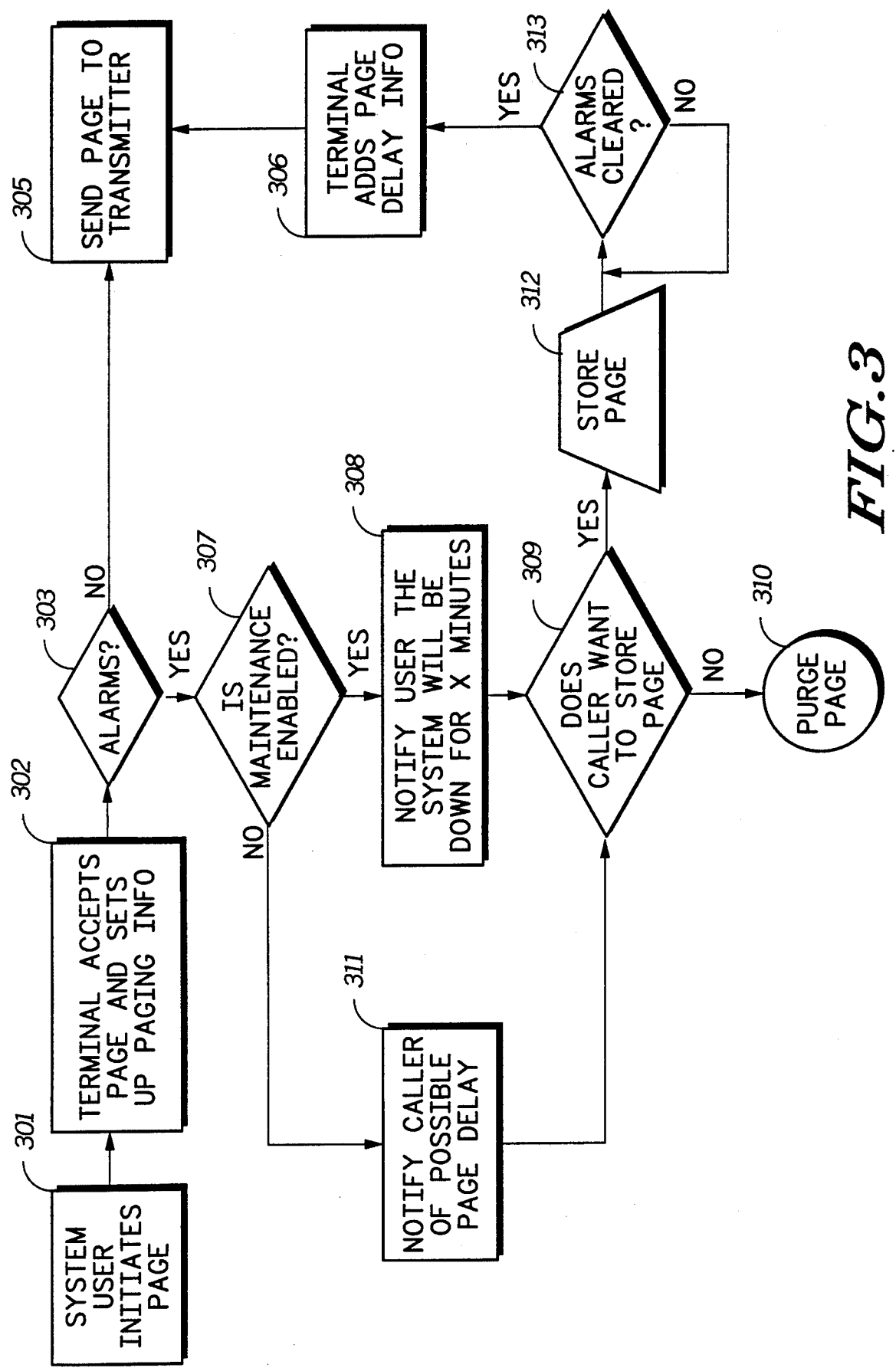
FIG. 3 is a flow diagram of the paging system process in accordance with the preferred embodiment of the invention.

Referring to FIG. 3, in the preferred embodiment, the system user initiates a page, step 301, from the telephone 101 or other suitable data entry device, after which the page is accepted by the terminal 103 and the paging information is set up 302. Next, a check is made to see if there are any malfunction alarms active 303. If there are no alarms active in step 303, the page is sent to the transmitter 104, step 305. If, in the step 303, there is at least one alarm active, a check is made to see if the maintenance feature is enabled 307. If, in step 307, the maintenance feature is found enabled, the terminal 103 notifies the user that the system will be down for "x" minutes 308, where "x" is based upon the amount of time entered into the terminal by the service person when the maintenance feature was enabled and upon the amount of pages already stored. The terminal then prompts the system user by asking if the suer wants to store the page, step 309. If, in step 307, the maintenance feature is not enabled, the terminal notifies the system user of a possible page delay of unknown duration 311, and the user is asked if he wants to store the page, step 309. If, in step 309, the user decides not to store the page, the page is purged from the system, step 310. If, in step 309, the user decides that the page should be stored, the page is stored 312 and a continuous check is made to see if the alarms have been cleared 313. Once the alarms have been cleared, the terminal adds page delay information to the stored page (so the pager user will known that he is receiving a delayed message), step 306, and the page is sent to the transmitter 104, step 305.

Although the preferred embodiment described herein is a paging terminal, it should be understood that the invention would work equally well in other types of systems, such as a data processing system.

I claim:

1. A paging system comprising:
   terminal input means for accepting pages;
   memory means coupled to the terminal input means for storing the pages;
   terminal output means coupled to the memory means for relaying the pages to at least one of a plurality of pagers;
   monitor means coupled to the output means for monitoring the status of the terminal output means; and
   control means coupled to the terminal input means, the memory means, and the monitor means, for continuing to accept and store the pages when the status of the terminal output means inhibits relaying the pages, and further for subsequently relaying the pages that were previously accepted and stored with the status of the terminal output means does not inhibit relaying the pages.

2. The paging system of claim 1 further comprising information means coupled to the terminal input means and to the monitor means for providing notification of the status of the terminal output means inhibiting the relaying of the pages.

3. The paging system of claim 2 further comprising programmable timer means coupled to the information means and to the monitor means for providing notification of the status of the terminal output means inhibiting the relaying of the pages for a predetermined time interval.

4. The paging system of claim 1 further comprising information means coupled to the memory means and to the monitor means for adding page delay information to the pages stored while the terminal output means inhibits relaying the pages.

5. The paging system of claim 4 further comprising programmable timer means coupled to the information means and to the monitor means for adding page delay information to the pages stored while the terminal output means inhibits relaying the pages for a predetermined time interval.

6. In a paging terminal, a method comprising the steps of:
   accepting pages;
   storing the pages;
   relaying the pages to at least one of a plurality of pagers; and
   monitoring whether the status of relaying the pages is inhibited;
   continuing to accept and store the pages when relaying the pages is inhibited; and
   subsequently relaying the pages that were previously accepted and stored when relaying the pages is not inhibited.

7. The method of claim 6 further comprising the step of providing notification of the status of relaying the pages being inhibited.

8. The method of claim 7 wherein the step of providing notification of the status of relaying the pages being inhibited comprises providing notification of the status of relaying the pages being inhibited for a predetermined time interval.

9. The method of claim 6 further comprising the step of adding page delay information to the pages stored while the relaying of the pages is inhibited.

10. The method of claim 9 wherein the step of adding page delay information to the pages stored while the relaying of the pages is inhibited comprises adding page delay information to the pages stored while the relaying of the pages is inhibited for a predetermined time interval.

11. A paging terminal comprising:

terminal input means for accepting pages;

memory means coupled to the terminal input means for storing the pages;

terminal output means coupled to the memory means for relaying the pages to at least one of a plurality of pagers;

monitor means coupled to the output means for monitoring the status of the terminal output means;

control means coupled to the terminal input means, the memory means, and the monitor means, for continuing to accept and store the pages when the status of the terminal output means inhibits relaying the pages, and further for subsequently relaying the pages that were previously accepted and stored when the status of the terminal output means does not inhibit relaying the pages;

first information means coupled to the terminal input means and to the monitor means for providing notification of the status of the terminal output means inhibiting the relaying of the pages;

second information means coupled to the memory means and to the monitor means for adding page delay information to the pages stored while the terminal output means inhibits relaying the pages; and programmable timer means coupled to the first information means, to the second information means, and to the monitor means for providing notification of the status of the terminal output means inhibiting the relaying of the pages for a predetermined time interval, and for adding page delay information to the pages stored while the terminal output means inhibits relaying the pages for a predetermined time interval.

* * * * *